Ian Stuart Millichamp, Newcastle upon Tyne (GB)

(12) United States Patent
Millichamp

(10) Patent No.: US 10,351,648 B2
(45) Date of Patent: Jul. 16, 2019

(54) METHOD OF PREPARING A ZWITTERIONIC COPOLYMER

(71) Applicant: Akzo Nobel Coatings International B.V., Arnhem (NL)

(72) Inventor: Ian Stuart Millichamp, Newcastle upon Tyne (GB)

(73) Assignee: AKZO NOBEL COATINGS INTERNATIONAL B.V., Arnhem (NL)

( * ) Notice: Subject to any disclaimer, the term of this patent is extended or adjusted under 35 U.S.C. 154(b) by 156 days.

(21) Appl. No.: 15/326,962

(22) PCT Filed: Jul. 22, 2015

(86) PCT No.: PCT/EP2015/066701
§ 371 (c)(1),
(2) Date: Jan. 17, 2017

(87) PCT Pub. No.: WO2016/012472
PCT Pub. Date: Jan. 28, 2016

(65) Prior Publication Data
US 2017/0204211 A1    Jul. 20, 2017

(30) Foreign Application Priority Data

Jul. 25, 2014 (EP) ..................................... 14178481

(51) Int. Cl.
| | |
|---|---|
| *C09D 5/16* | (2006.01) |
| *C09D 7/65* | (2018.01) |
| *C08F 220/18* | (2006.01) |
| *C08F 220/36* | (2006.01) |
| *C09D 133/14* | (2006.01) |
| *C08F 2/48* | (2006.01) |
| *C09J 133/14* | (2006.01) |

(52) U.S. Cl.
CPC ............. *C08F 220/18* (2013.01); *C08F 2/48* (2013.01); *C08F 220/36* (2013.01); *C09D 5/1637* (2013.01); *C09D 5/1662* (2013.01); *C09D 7/65* (2018.01); *C09D 133/14* (2013.01); *C09J 133/14* (2013.01); *C08F 2220/1825* (2013.01); *C08F 2800/10* (2013.01)

(58) Field of Classification Search
CPC combination set(s) only.
See application file for complete search history.

(56) References Cited

U.S. PATENT DOCUMENTS

| | | | | |
|---|---|---|---|---|
| 5,648,442 | A * | 7/1997 | Bowers ................... | C07F 9/091 427/372.2 |
| 6,090,901 | A * | 7/2000 | Bowers ................. | C08F 230/02 526/277 |
| 6,262,299 | B1 | 7/2001 | Tsai et al. | |
| 2010/0068156 | A1* | 3/2010 | Kim ..................... | A61K 8/8111 424/45 |
| 2011/0160392 | A1* | 6/2011 | Chang ................... | C08F 220/38 524/608 |
| 2013/0178125 | A1* | 7/2013 | Jiang ...................... | C09D 5/165 442/1 |

FOREIGN PATENT DOCUMENTS

| | | |
|---|---|---|
| EP | 2 468 825 A1 | 6/2012 |
| JP | 62-241901 A | 10/1987 |
| JP | 2001-172330 A | 6/2001 |
| WO | 01/004201 A1 | 1/2001 |
| WO | 07/024393 A2 | 3/2007 |

OTHER PUBLICATIONS

Liu et al., "A Facil Method of Using Sulfo-Betaine-Containing Copolymers for Biofouling Resistance", J. Appl. Polym. Sci. (2014), 13 (18), 40789/1-40789/9. First published Apr. 18, 2014 (Year: 2014).*
ASM International, ASM Handbook, Volum 13C—Corrosion:Environments and Industries: Table 1.: Examples of Aprotic and Protic Solvents and Their Physical Properties, 2006. (Year: 2006).*
John Wiley & Sons, Chemist's Companion—A Handbook of Practical Data, Techniques, and References, 1972. (Year: 1972).*

* cited by examiner

*Primary Examiner* — Nicole M. Buie-Hatcher
(74) *Attorney, Agent, or Firm* — McDonnell Boehnen Hulbert & Berghoff LLP

(57) ABSTRACT

A method for preparing a zwitterionic co-polymer comprising the steps of: a) providing a solution of at least one ethylenically unsaturated polymerizable zwitterionic monomer dissolved in a solvent; b) combining said solution of zwitterionic monomer with at least one co-monomer being selected from cationic, anionic and non-ionic ethylenically unsaturated monomers; c) polymerizing the zwitterionic monomer and said at least one co-monomer in the presence of said solvent to form a solution or dispersion of co-polymer; and, d) replacing at least part of said solvent with a further solvent in which said co-polymer shows sufficient solubility to form a solution of said co-polymer in that further solvent. Step b) and step c) of this method may be performed sequentially or concurrently.

15 Claims, No Drawings

METHOD OF PREPARING A ZWITTERIONIC COPOLYMER

This application is a US national phase of International Application No. PCT/EP2015/066701, filed Jul. 22, 2015, which claims priority to European Application No. 14178481.9, filed Jul. 25, 2014.

TECHNICAL FIELD

The present invention is directed to a method of preparing a zwitterionic copolymer. The prepared zwitterionic copolymer may be used in a coating composition and may find particular utility in a fouling-release coating.

BACKGROUND TO THE INVENTION

Structures submerged in marine ecosystems may be subjected to "biofouling", the undesired accumulation of microorganisms, algae and/or marine animals on the surface of the structure. The process of surface biofouling may be initiated by the adhesion of a film containing organic matter and dissolved macromolecules, such as polysaccharides, proteins and protein fragments, which is then followed by the adhesion of bacteria, protozoa, microphytes, algae and invertebrates.

The accumulation of biological material can obviously become highly detrimental: a layer of marine organisms on a ship's hull can, for instance, decrease the speed and maneuverability of the ship and can also raise propulsive fuel consumption by as much as 30 percent. To mitigate these effects and to prevent the formation of such a fouling layer, marine structures have generally been coated with anti-fouling paints incorporating compounds, such as organo-tin compounds and cuprous oxide, which are toxic at low concentrations to most fouling organisms. Unfortunately, these biocidal compounds persist in water and have been linked to deformity in non-fouling marine organisms. As such, a number of States have legislated against the use of organo-tin compounds in anti-fouling paints and supra-national organizations such as the Marine Environment Protection Committee (MEPC) of the International Maritime Organization have also passed resolutions of equivalent effect.

The alternatives to tin-based anti-fouling paints which were consequently developed may broadly be categorized into low-leach-rate paints, optionally having a toxic compound or moiety therein, and non-toxic fouling release paints.

The first category of paints comprises an ablative resin which slowly but constantly dissolves, taking with it the early stages of fouling. To supplement this effect, copper-based or alternative biocidal compounds may be held within the resin and released over time. Alternatively, labile functional groups within the ablative resin may hydrolyze to release a toxic compound. Problematically, these ablative coatings require a constant water flow and are most effective at consistently high water velocities. Moreover, the lifetime of these coatings is highly variant, depending on the initial thickness of the coating and the temperature of the seawater.

The non-toxic fouling release category of paints—with which the present application is concerned—are intended to prevent the attachment of fouling. Where they do foul, the strength of the attachment between the matter and the marine structure should be so weak that it can be broken either by the weight of the fouling or by the motion of the ship through the water.

The performance of the fouling release coatings is mainly determined by three properties: surface energy, on the basis that a low surface energy will discourage the initial attachment of fouling; the modulus of the coating as this influences the fracture mechanism by which the interface between a coating and a foulant will fail; and, the thickness of the coating as it can be determinative of the balance between shear and peel fracture of the applied paint or coating. Whilst micro-scale and nano-scale structuring of the coating can influence these properties, the chemistry of the coating is a critical determinant of its surface energy and modulus.

Fouling release paints based on poly(ethylene glycol), polyvinyl acetate (PVA), polyacrylates, oligosaccharides, fluorinated polymers and silicone polymers are well-known. Recently however attention has been directed to coatings which contain zwitterionic moieties. Such species can be effective at preventing non-specific protein adhesion and whole organism fouling but, as a flip-side to these effects, zwitterionic molecules are highly hydrophilic and thus have a tendency to dissolve too rapidly in water. Consequently, the prior art has been concerned with immobilizing the zwitterionic moieties within anti-fouling and fouling resistant coatings and, in particular, in incorporating said moieties into copolymers.

US Patent Application Publication No. 2008/181861 (Jiang et al.) describes a substrate, such as a ship's hull, having a low fouling surface, said surface comprising a monolayer of a sulfobetaine or a carboxybetaine material. In an embodiment, the sulfobetaine material is a well-defined diblock copolymer comprising a poly(sulfobetaine) and poly(propylene oxide). This co-polymer is formed in process comprising the steps of: synthesizing a poly(propylene oxide) macro-initiator (PPO-Br) by reacting monohydroxy-based poly(propylene glycol) with 2-bromoisobutyrylbromide in tetrahydrofuran; purification of that macro-initiator; sequential linking of sulfobetaine methacrylate monomer to the macro-initiator by atom transfer radical polymerization (ATRP); passing the resulting reaction solution through an aluminum oxide column; precipitating the product into ethanol and repeatedly re-dissolving said product into water to remove residual transition metal halide catalysts.

US Patent Application Publication No. 2011/0218290 A1 (Webster et al.) discloses the preparation of a zwitterionic/amphiphilic pentablock copolymer using atom transfer radical polymerization (ATRP). After removal of the copper bead or copper halide catalysts, the resultant pentablock copolymer is incorporated into a polyurethane coating composition which may find utility in antifouling and/or fouling release applications.

McCormick, et al., *Polymer*, 1992, 33, 4617 discloses a copolymer of acrylamide and the zwitterionic monomer 3-(2-acrylamido-2-methylpropanedimethylamino)-1-propanesulfonate. In this teaching the copolymers were prepared as homogeneous solutions in water but the polymerization was stopped at low conversion of monomer on account of the unmanageable viscosities attained.

There exists a need in the art to develop co-polymerization techniques that do not require the use of transition metal catalysts which have to be removed from the synthesized zwitterionic copolymer prior to their use. Moreover, there is a need to develop a simple method—which should be capable to being scaled up such that it is performable at an industrial scale—for generating non-block zwitterionic copolymers in amounts appropriate for the large area surfaces with which fouling resistant coatings are concerned.

STATEMENT OF THE INVENTION

In accordance with a first aspect of the invention, there is provided a method of preparing a zwitterionic co-polymer comprising the steps of:

a) Providing a solution of at least one ethylenically unsaturated polymerizable zwitterionic monomer dissolved in a solvent;

b) Combining said solution of zwitterionic monomer with at least one co-monomer being selected from cationic, anionic and non-ionic ethylenically unsaturated monomers;

c) Polymerizing the zwitterionic monomer and said at least one co-monomer in the presence of said solvent to form a solution or dispersion of co-polymer; and, d) Replacing at least part of said solvent with a further solvent in which said co-polymer shows sufficient solubility to form a solution of said co-polymer in that further solvent.

Steps b) and c) as defined above and in the embodiments herein-below may be performed sequentially or concurrently.

In a first, important embodiment of this aspect of the invention, the method comprises the steps of:

a) Providing a solution in a first solvent of at least one zwitterionic monomer, said zwitterionic monomer being selected from monomers of Formula A, monomers of Formula B or mixtures thereof;

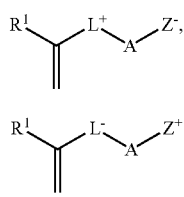

Formula A

Formula B wherein:

$R^1$ is hydrogen or methyl;

$L^+$ is an aliphatic, alicyclic or aromatic divalent group comprising up to 40 carbon atoms and a cation selected from N+, P+ and S+;

$L^-$ is a group of formula

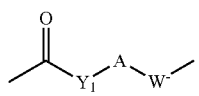

A is an alkyl, alkenyl, alkynyl, aryl or aralkyl group having up to 16 carbon atoms, $W^-$ is

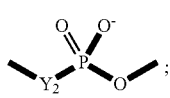

$Y_1$ and $Y_2$ are independently selected from O or $NR^2$;

$Z^-$ is $CO_2^-$, or $SO_3^-$ or

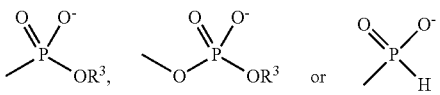

$Z^+$ is $-N^+R^4R^5R^6$, $-P^+R^4R^5R^6$ or $-S^+R^4R^5$, and, $R^2$, $R^3$, $R^4$, $R^5$ and $R^6$ are independently selected from hydrogen, $C_6$-$C_{20}$ aryl, $C_7$-$C_{20}$ aralkyl and $C_1$-$C_{20}$ alkyl;

b) Combining said solution of zwitterionic monomer with at least one co-monomer and optionally an amount of a second solvent, wherein said at least one co-monomer is selected from cationic, anionic and non-ionic ethylenically unsaturated monomers;

c) Polymerizing the zwitterionic monomer and said at least one co-monomer to form a dispersion of co-polymer in said first and second solvents; and, d) Replacing at least part of said first and second solvents with a third solvent in which said co-polymer is soluble, thereby forming a solution of said co-polymer.

Preferably in Formula A above, $L^+$ is a group of formula

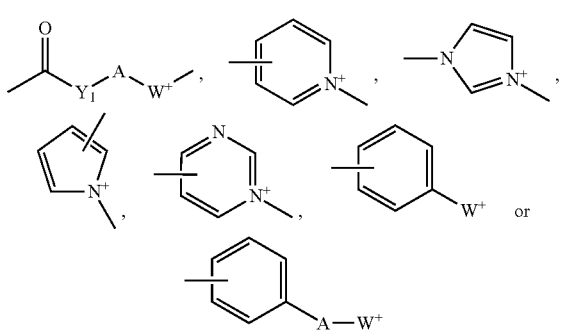

in which:

A is an alkyl, alkenyl, alkynyl, aryl or aralkyl group having up to 16 carbon atoms, and, $W^+$ is $-S^+R^7-$, $-N^+R^8R^9-$, or $-P^+R^8R^9-$, wherein: $R^7$, $R^8$ and $R^9$ are independently selected from hydrogen, $C_1$-$C_{20}$ alkyl, $C_6$-$C_{20}$ aryl and $C_7$-$C_{20}$ aralkyl, and preferably are independently selected from $C_1$-$C_6$ alkyl.

Typically, the ethylenically unsaturated, non-zwitterionic co-monomer of step b) comprises at least 50%, by weight of co-monomer, of monomers selected from: (meth)acrylonitrile; alkyl (meth)acrylate esters; (meth)acrylic acids; vinyl esters; and, vinyl monomers. It is preferred in this context that the ethylenically unsaturated co-monomer comprises at least 50%, by weight of co-monomer, of non-ionic monomers selected from $C_1$ to $C_{14}$, preferably $C_2$ to $C_{12}$ alkyl esters of (meth)acrylic acid.

Independent of the selection of the zwitterionic monomer and the ethylenically unsaturated co-monomer, the molar amount of zwitterionic monomer combined in step b) should be, based on the total number of moles of zwitterionic monomer and said at least one co-monomer, in the range from 2 to 80 mol. %, preferably from 5 to 60 mol. % and more preferably from 10 to 50 mol. %.

The solvent for the zwitterionic monomer in step a) or where applicable the first and second solvent as mentioned above may be defined by a Hansen Total Solubility Parameter ($\delta_t$) from 20 to 38 $MPa^{1/2}$ as determined at 25° C. at atmospheric pressure; the polar ($\delta_p$) and hydrogen bonding ($\delta_h$) components thereof should be ≥5 $MPa^{1/2}$ and ≥10

MPa$^{1/2}$ respectively. The disclosure of *Hansen Solubility Parameters, A User's Handbook*, 2nd Edition, Charles M. Hansen, CRC Press (2007) is hereby incorporated by reference. Whilst solvents meeting these conditions are typically alcohols, glycols and ether alcohols, the invention does not preclude the use of non-alcoholic solvents such as ethylene carbonate, aniline, acetonitrile, ethylenediamine, dimethylformamide, trimethyl phosphate and dimethyl sulfoxide.

The above mentioned first solvent may preferably comprise, by weight of said solvent: from 70 to 100 wt. % of one or more $C_1$ to $C_4$ alkanols; from 0 to 30 wt. % organic co-solvent; and, from 0 to 20 wt. % water. In an independent embodiment, the second alcoholic solvent is the same or different from said first alcoholic solvent and comprises, by weight of said solvent: from 70 to 100 wt. % of one or more $C_1$ to $C_4$ alkanols; from 0 to 30 wt. % organic co-solvent; and, from 0 to 20 wt. % water.

In an effective variant of the method of this invention, the further or third solvent introduced in step d) is selected to have a boiling point which is higher than the boiling point of each solvent present in the preceding steps of the method, such as the defined first and second solvents where applicable. By making such a selection, the first and, optionally, the second solvent may be substantially removed by distillation from the co-polymer solution or dispersion.

The third or further solvent of the invention—of step d)—should preferably comprise, by weight of said solvent: from 70 to 100 wt. % of one or more of benzene and liquid alkyl benzenes in which the or each alkyl substituent on the benzene ring contains from 1 to 12, preferably 1 to 4 carbon atoms; and, from 0 to 30 wt. % organic co-solvent.

An exemplary method for preparing a zwitterionic co-polymer comprises the steps of:

a) Providing a solution in a first alcoholic solvent of zwitterionic monomer as defined in Formula I:

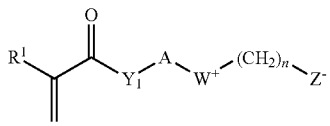

Formula I wherein:
R$^1$ is hydrogen or methyl;
Y$_1$ is selected from O and NR$^2$;
A is a linear or branched alkyl group having from 1 to 16, preferably from 1 to 10 carbon atoms;
Z$^-$ is CO$_2^-$, or SO$_3^-$ or

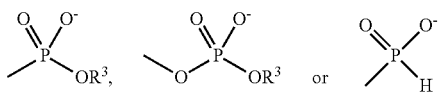

W$^+$ is —S$^+$R$^7$—, —N$^+$R$^8$R$^9$—, or —P$^+$R$^8$R$^9$—;
n is an integer of from 1 to 5; and
R$^2$, R$^3$, R$^7$, R$^8$, and R$^9$ are independently selected from hydrogen, $C_1$-$C_{20}$ alkyl, $C_6$-$C_{20}$ aryl and $C_7$-$C_{20}$ aralkyl, and preferably are independently selected from $C_1$-$C_6$ alkyl;

b) feeding said solution of zwitterionic monomer into a second alcoholic solvent into which solvent is separately fed at least one co-monomer, said at least one co-monomer being selected from cationic, anionic and non-ionic ethylenically unsaturated monomers;

c) polymerizing the zwitterionic monomer and said at least one co-monomer to form a dispersion of co-polymer in said first and second alcoholic solvents; and, d) replacing at least a part of said first and second alcoholic solvents with a third solvent in which said co-polymer is soluble, thereby forming a solution of said co-polymer.

Prior art processes for coating surfaces with zwitterionic polymers which rely on surface grafting or layer-by-layer techniques are not amenable to scaling-up for use in, for instance, the shipping industry. By contrast, the polymerization process of the present invention has the advantage of simplicity and facile scalability to allow for the synthesis of copolymer in the large amounts required for use in coatings for marine structures, such as the hulls of ships.

Further, the polymerization process has been found to provide co-polymers having a polydispersity index (PDI) of greater than 1.5 as determined by Gel Permeation Chromatography (GPC). For example, polydispersities in the range from 2.5 to 5.0 have been achieved. It is considered that the broad molecular weight distribution of the polymer contributes to the favorable mechanical properties of the coatings in which the polymers are included.

In accordance with a second aspect of the present invention, there is provided a zwitterionic co-polymer prepared in accordance with the above defined method.

In accordance with a third aspect of the present invention, there is provided a fouling resistant coating comprising a zwitterionic co-polymer prepared in accordance with the method as defined above.

Definitions

The term "comprising" as used herein will be understood to mean that the list following is non-exhaustive and may or may not include any other additional suitable items, for example one or more further feature (s), component (s), ingredient (s) and/or substituent (s) as appropriate.

A monomer is a substantially mono-disperse compound of low molecular weight—typically but not necessarily less than one thousand Daltons—that is capable of being polymerized. Generally, a monomer will be a polymerizable allylic, vinylic or acrylic compound. The term "nonionic monomer" means a monomer as defined herein which is electrically neutral. A "cationic monomer" means a monomer as defined herein which possesses a net positive charge and an "anionic monomer" means a monomer as defined herein which possesses a net negative charge.

As used herein "zwitterionic" means a molecule containing cationic and anionic (charged) substituents in equal proportions, so that the molecule is net neutral overall.

The term "alkyl" includes both branched and straight chain alkyl groups having the recited number of carbon atoms. Typical alkyl groups are methyl, ethyl, n-propyl, iso-propyl, n-butyl, sec-butyl, isobutyl, t-butyl, n-pentyl, isopentyl, n-hexyl, n-heptyl, isooctyl, nonyl, decyl, undecyl, dodecyl and the like.

The term "alkenyl" refers to an ethylenically unsaturated hydrocarbon group having 1 or 2 ethylenic bonds and includes both straight and branched chain groups having the recited number of carbon atoms.

The term "alkynyl" refers to an unsaturated hydrocarbon group having 1 or 2 acetylenic bonds and includes both straight and branched chain groups having the recited number of carbon atoms.

The term "aryl" includes phenyl, napthyl or anthracenyl, which may be substituted with up to three substituents independently selected from the group consisting of cyano, phenyl, phenoxy, $(C_1-C_4)$alkyl, $(C_1-C_4)$alkoxy, $(C_1-C_4)$alkylthio and $(C_1-C_4)$alkylsulfoxide. Typical aryl substituents include but are not limited to 2-methylphenyl, 3-methyphenyl and 4-methylphenyl.

The term "aralkyl" is used to describe a group wherein the alkyl chain is from 1 to 10 carbon atoms and can be branched or straight chain, with the aryl portion, as defined above, forming a terminal portion of the aralkyl moiety. Typical aralkyl moieties are optionally substituted benzyl, phenethyl, phenpropyl and phenbutyl moieties.

Where the stem "(meth)acryl" is used in the present description and claims, this is intended to mean "acryl" and/or "methacryl".

The term "free radical addition polymerization initiator" refers to a compound used in an effective amount to initiate a free radical addition polymerization. The choice of initiator depends mainly upon its solubility and its decomposition temperature.

As used herein "solvents" are substances capable of dissolving another substance to form a uniform solution; during dissolution neither the solvent nor the dissolved substance undergoes a chemical change. Solvents may either be polar or non-polar. The term "alcoholic solvent" encompasses such solvents which are any water-soluble monoalcohols, diols or polyols that are liquids at 25° C. at atmospheric pressure.

If an organic liquid product has a boiling point region, then the onset (the lowest temperature) of the boiling point range at atmospheric pressure is taken as the nominal boiling point. Where necessary any measurement of the initial boiling point for materials should be conducted in accordance with ASTM Standard Test Method D1078-95, or its most current version.

Water, for use as a co-solvent herein, is intended to mean water of low solids content as would be understood by a person of ordinary skill in the art. The water may, for instance, be distilled water, demineralized water, deionized water, reverse osmosis water, boiler condensate water, or ultra-filtration water. Tap water may be tolerated in certain circumstances.

The measurement of the solids content of materials shall be conducted in accordance with EPA Test Method 24 (40 CFR 60, Appendix A).

The polydispersity index (PDI) is a measure of the distribution of molecular mass in a given polymer material and may be calculated as the ratio of the weight average molecular weight (Mw) to the number average molecular weight (Mn). The polydispersity of a given sample of polymer or copolymer may be conveniently determined by Gel-Permeation Chromatography (GPC) also known as Size Exclusion Chromatography (SEC). This technique measures both Mw and Mn of the sample, and the ratio of Mw/Mn is determined from the measured values.

All percentages, ratios and proportions used herein are given on a weight basis unless otherwise specified.

DETAILED DESCRIPTION OF THE INVENTION

Zwitterionic Monomer

The at least one zwitterionic monomer incorporated into the copolymer of the present invention is typically selected from monomers of Formula A, monomers of Formula B or mixtures thereof, wherein Formula A and Formula B are as defined below;

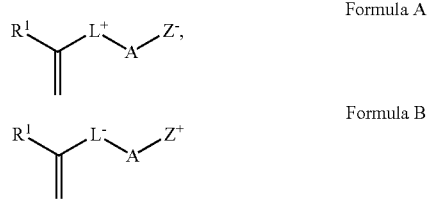

wherein:
$R^1$ is hydrogen or methyl;
$L^+$ is an aliphatic, alicyclic or aromatic divalent group comprising up to 40 carbon atoms and a cation selected from N+, P+ and S+;
$L^-$ is a group of formula

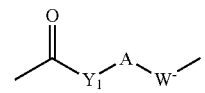

A is an alkyl, alkenyl, alkynyl, aryl or aralkyl group having up to 16 carbon atoms,
$W^-$ is

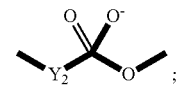

$Y_1$ and $Y_2$ are independently selected from O or $NR^2$;
$Z^-$ is $CO_2^-$, or $SO_3^-$ or

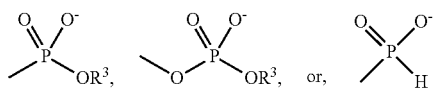

$Z^+$ is $—N^+R^4R^5R^6$, $—P^+R^4R^5R^6$ or $—S^+R^4R^5$, and,
$R^2$, $R^3$, $R^4$, $R^5$ and $R^6$ are independently selected from hydrogen, $C_6-C_{20}$ aryl, $C_7-C_{20}$ aralkyl and $C_1-C_{20}$ alkyl.

Preferably in Formula A above, $L^+$ is a group of formula

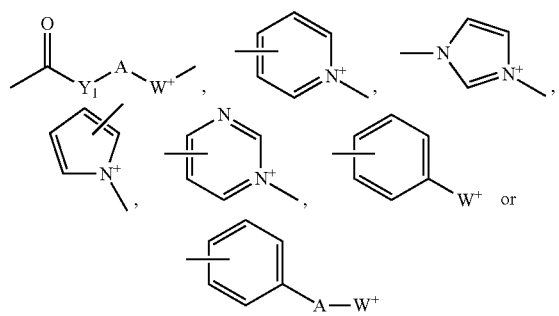

in which:
A is an alkyl, alkenyl, alkynyl, aryl or aralkyl group having up to 16 carbon atoms, and,
$W^+$ is $-S^+R^7-$, $-N^+R^8R^9-$, or $-P^+R^8R^9-$,
wherein: $R^7$, $R^8$ and $R^9$ are independently selected from hydrogen, $C_1$-$C_{20}$ alkyl, $C_6$-$C_{20}$ aryl and $C_7$-$C_{20}$ aralkyl, and preferably are independently selected from $C_1$-$C_6$ alkyl.

For both Formula A and Formula B, it is preferred that each A group be independently selected from linear or branched alkyl groups having from 1 to 16 or from 1 to 10 carbons atoms. Alternatively or additionally, it is preferable that $R^2$, $R^3$, $R^4$, $R^5$, $R^6$, $R^7$, $R^8$ and $R^9$ are independently selected from hydrogen and methyl. For instance at least one, preferably at least two and more preferably at least four of $R^2$, $R^3$, $R^4$, $R^5$, $R^6$, $R^7$, $R^8$ and $R^9$ may be methyl groups.

In a preferred zwitterionic monomer conforming to Formula A, the constituent $L^+$ is a group of formula:

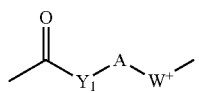

in which group A is selected from linear or branched alkyl groups having from 1 to 16 or from 1 to 10 carbons atoms. More particularly, the zwitterionic monomer conforms to the Formula 1 as defined above and has the following structure:

Formula Ia

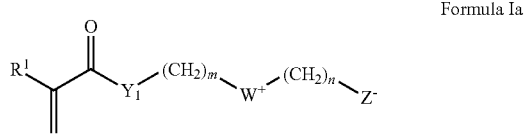

wherein:
$R^1$ is hydrogen or methyl;
$Y_1$ is selected from O and $NR^2$;
m=2 or 3;
n=1 to 5; and
Z is $CO_2^-$, or $SO_3^-$ or

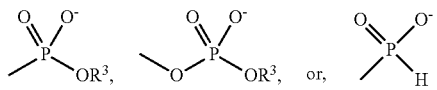

and,
W is $-S^+R^7-$, $-N^+R^8R^9-$ or $-P^+R^8R^9-$;
$R^2$, $R^3$, $R^7$, $R^8$, and $R^9$ are independently selected from hydrogen and $C_1$-$C_4$ alkyl;

In a subset of preferred monomers conforming to Formula 1: Y is O; W is $-N^+R^8R^9-$; and, Z is $SO_3^-$. Again, within Formula 1a, it is preferable that $R^2$, $R^3$, $R^7$, $R^8$ and $R^9$ are independently selected from hydrogen and methyl.

Exemplary monomers of Formula 1 and/or Formula Ia include but are not limited to: dimethylmethacryloyloxyethyl-sulfopropyl ammonium betaine (sulfobetaine methacrylate available from Raschig GmbH as Ralumer SPE); sulfopropylvinylpyridinium betaine (available from Rashig GmbH as Ralumer SPV); and, dimethylmethacrylamidosulfopropyl ammonium betaine (available from Sigma Aldrich).

An exemplary monomer of Formula B is 2-methacryloyloxyethylphosphorylcholine (available as Lipidure™ PC from NOF Corporation).

Process Step a)

Broadly, the first step of the present invention comprises providing a solution of ethylenically unsaturated zwitterionic monomer dissolved in a suitable solvent. This step will have two constituent parts, namely the provision of the zwitterionic monomer followed by the dissolution of that zwitterionic monomer in the solvent but there is no intention to limit the meaning of "providing" in this context. For example, it is envisaged that a solution may be provided by screw feeding a solid zwitterionic monomer into said solvent.

Any dissolution of the zwitterionic monomer may of course be facilitated by raising the temperature of the solvent, whilst being mindful that the temperature should be below the boiling point of that solvent. Having regard to the typical and preferred alcohols of which the first solvent may be comprised, the dissolution step may be performed at a temperature in the range of from 30° C. to 120° C.; the solution thus formed can be maintained within this temperature range for subsequent combination with the non-zwitterionic, ethylenically unsaturated copolymer.

As mentioned above, the solvent for the zwitterionic monomer in step a) may generally be defined by a Hansen Total Solubility Parameter ($\delta_t$) from 20 to 38 $MPa^{1/2}$ as determined at 25° C. at atmospheric pressure; the polar ($\delta_p$) and hydrogen bonding ($\delta_h$) components thereof should be ≥5 $MPa^{1/2}$ and ≥10 $MPa^{1/2}$ respectively.

The preferred solvent for the zwitterionic monomer is alcoholic and should typically comprise greater than 60 wt. %, by weight of said solvent, of one or more alcohols with any remainder of the solvent comprising one or more co-solvents.

Suitable alcohol solvents include methanol, ethanol, n-propanol, 2-propanol, n-butanol, isobutanol and tert-butanol, hexanol, benzyl alcohol, cyclohexanol, diacetone alcohol (4-hydroxy-4-methylpenta-2-one), ethylene glycol, ethylene glycol mono-($C_1$-$C_4$)-alkyl ethers, diethylene glycol, diethylene glycol mono-($C_1$-$C_4$)alkyl ethers, propylene glycol, propylene glycol mono-($C_1$-$C_4$)alkyl ethers, dipropylene glycol, and dipropylene glycol mono-($C_1$-$C_4$)alkyl ethers. As regards the glycol mono-alkyl ether solvents, specific examples which may be mentioned are ethylene glycol monomethyl ether, diethylene glycol monomethyl ether, ethylene glycol monobutyl ether, diethylene monobutyl ether, propylene glycol phenyl ether, dipropylene glycol N-propyl ether, propylene glycol monomethyl ether, propylene glycol monopropyl ether, dipropylene glycol monopropyl ether, propylene glycol monobutyl ether, and dipropylene glycol monobutyl ether.

In a particularly preferred embodiment, this first alcoholic solvent comprises, by weight of said solvent: from 70 to 100 wt. % of one or more $C_1$ to $C_4$ alkanols; from 0 to 30 wt. % organic co-solvent; and, from 0 to 20 wt. % water. The $C_1$ to $C_4$ alkanols are thus selected from methanol, ethanol, n-propanol, 2-propanol and 2-butanol, n-butanol, isobutanol, and tert-butanol, and combinations thereof.

The co-solvents which may be used in addition to the alcohols include: ether solvents such as diethylene glycol di-($C_1$-$C_4$)alkyl ether, dipropylene glycol di-($C_1$-$C_4$)alkyl ether, diethyl ether, dipropyl ether, methyl cyclopropyl ether, tetrahydrofuran, dioxane, and anisole; ketone solvents such as methyl ethyl ketone, diethyl ketone, isobutyl methyl ketone, cyclohexanone, isophorone, and acetophenones; ester solvents such as methyl acetate, ethyl acetate, butyl acetate, propyl acetate, methyl butyrate, ethyl butyrate, 2-methoxyethyl acetate, propylene glycol monomethyl ether acetate, dipropylene glycol butyl ether acetate, diethylene glycol monobutyl ether acetate, dioctyl phthalate, caprolactone, methyl lactate, and ethyl lactate; halogenated solvents such as chloroform and dichloroethane; diglyme and triglyme; amide solvents such as dimethylformamide, dimethylacetamide, pyrrolidone, N-methylpyrrolidone, and caprolactam; dimethyl sulfoxide; sulfolane; tetramethylurea; ethylene carbonate; propylene carbonate; dimethyl carbonate; ethyl carbonate; nitromethane; acetonitrile; and, nitrobenzene.

Process Step b)

In step b) of the aforementioned process, the solution of zwitterionic monomer is combined with at least one co-monomer selected from cationic, anionic and non-ionic ethylenically unsaturated monomers. However, in a preferred embodiment, the co-monomer should comprise: from 0 to 40 wt. %, preferably from 0 to 20 wt. %, based on the total co-monomer weight, of ionic monomers.

Exemplary non-zwitterionic olefinically unsaturated monomers, for inclusion in the co-monomer feed may be selected from the group consisting of: alkyl (meth)acrylate esters; hydroxyalkyl (meth)acrylate esters; polyalkylene glycol mono(meth)acrylates; mono (meth)acrylates of (polyalkylene) glycol monoalkyl, alkylene and alkyne ethers or esters; (meth)acrylic acids; (meth)acrylonitrile; (meth) acrylamide and derivatives thereof; vinyl esters; vinyl amides; and, vinyl monomers.

Suitable alkyl and hydroxyalkyl esters of acrylic acid and methacrylic acid are those derived from $C_1$ to $C_{14}$ alcohols and thereby include as non-limiting examples: methyl (meth)acrylate; ethyl (meth)acrylate; isopropyl (meth)acrylate; n-propyl (meth)acrylate; n-butyl (meth)acrylate; isobutyl (meth)acrylate; cyclohexyl (meth)acrylate; 2-ethylhexyl (meth)acrylate; isobornyl (meth)acrylate; 4-tert-butylcyclohexyl (meth)acrylate; isodecyl (meth)acrylate; lauryl (meth) acrylate, 2-hydroxyethyl acrylate; hydroxyethyl methacrylate; hydroxypropyl (meth)acrylate; 2-hydroxybutyl methacrylate; and, di(meth)acrylate esters of alkane diols such as 1,4-butanediol diacrylate and 1,6-hexane diol diacrylate.

The use, in the co-monomer feed, of macro-monomers bearing terminal (meth)acrylate groups is also not precluded. Useful macro-monomers might have a molecular weight of up to 5000 daltons. Polydimethylsiloxane mono(meth)acrylates, such as KF-2012 (available from Shin-Etsu Chemical Co. Ltd) and poly(ethyleneglycol) mono-methacrylates, such as Bisomer MPEG350MA (available from GEO Specialty Chemicals) might be mentioned as suitable examples of such macro-monomers.

Suitable derivatives of (meth)acrylamide, which may be useful in increasing the stability of a co-monomer feed dispersion, include N-methyl(meth)acrylamide, N,N-dimethyl(meth)acrylamide, N-isopropyl(meth)acrylamide, N-(2-hydroxypropyl)methacrylamide, and N-methylolacrylamide.

Suitable vinyl esters include vinyl acetate, vinyl propionate, vinyl versatate, vinyl caprolate and vinyl laurate.

Suitable vinyl amides may be cyclic or acyclic and thus include, but are not limited to: N-vinyl-2-pyrrolidone; alkylated N-vinyl-2-pyrrolidones; N-vinyl acetamide; N-propenylacetamide; N-(2-methylpropenyl)acetamide; N-vinyl formamide; N-(2,2-dichloro-vinyl)-propionamide; N-ethenyl acetamide; N-vinyl-N-methyl acetamide; and, N-vinyl-N,N-propyl propionamide.

Suitable vinyl monomers include: $C_4$-$C_8$ dienes such as 1,3-butadiene; isoprene; styrene; t-butylstyrene; isopropylstyrene; divinyl benzene; heterocyclic vinyl compounds; and, vinyl halides such as chloroprene. Preferably the vinyl monomers include ethylene, styrene, butadiene and isoprene.

Representative cationic monomers include: (3-methacryloylamino)propyl trimethylammonium halide salt; (3-methacryloylamino)propyl trimethylammonium dodecylbenzene sulfonate salt; the quaternary or acid salts of dialkylaminoalkyl (meth)acrylates; the quaternary or acid salts of dialkylaminoalkyl(meth)acrylamides; N,N-diallyldialkyl ammonium halides; and, Mannich products. In such monomers, where applicable, the alkyl groups present will generally be $C_{1-12}$ alkyl and more usually $C_{1-4}$ alkyl. And as suitable examples N,N-dimethylaminoethylacrylate methyl chloride quaternary salt (DMAEA.MCQ) and diallyldimethylammonium chloride (DADMAC) may be mentioned.

Representative anionic monomers include: metal salts of (meth)acrylic acid or itaconic acid; 2-acrylamido-2-methyl propane sulfonate; sulfopropyl (meth)acrylate; other polymerizable carboxylic or sulphonic acids; sulphomethylated acrylamide; allyl sulphonate; and, sodium vinyl sulphonate.

As mentioned above, the step of combining the zwitterionic monomer with the cationic, anionic or non-ionic ethylenically unsaturated monomer preferably comprises feeding the solution of zwitterionic monomer, preferably in a first alcoholic solvent, into a second solvent into which second solvent is separately fed the cationic, anionic or non-ionic ethylenically unsaturated co-monomer.

The second solvent, into which the feed of the zwitterionic monomer and the feed of the co-monomer may be introduced, may be the same or different from the first solvent. As such, that second solvent as mentioned should also be defined by a Hansen Total Solubility Parameter ($\delta t$) of from 20 to 38 $MPa^{1/2}$ as determined at 25° C. at atmospheric pressure; the polar ($\delta_p$) and hydrogen bonding ($\delta_h$) components thereof should be ≥5 $MPa^{1/2}$ and ≥10 $MPa^{1/2}$ respectively. It is again preferred that the second solvent be alcoholic and it should typically comprise greater than 60 wt. %, by weight of said solvent, of one or more alcohols with any remainder of the solvent comprising one or more co-solvents.

Suitable alcohol solvents include methanol, ethanol, n-propanol, 2-propanol, n-butanol, isobutanol and tert-butanol, hexanol, benzyl alcohol, cyclohexanol, ethylene glycol, ethylene glycol mono-($C_1$-$C_4$)-alkyl ethers, diethylene glycol, diethylene glycol mono-($C_1$-$C_4$)alkyl ethers, propylene glycol, propylene glycol mono-($C_1$-$C_4$)alkyl ethers, dipropylene glycol, and dipropylene glycol mono-($C_1$-$C_4$)alkyl ethers. As regards the glycol mono-alkyl ether solvents, specific examples which may be mentioned are ethylene glycol monomethyl ether, diethylene glycol monomethyl ether, ethylene glycol monobutyl ether, diethylene monobutyl ether, propylene glycol phenyl ether, dipropylene glycol N-propyl ether, propylene glycol monomethyl ether, propylene glycol monopropyl ether, dipropylene glycol monopropyl ether, propylene glycol monobutyl ether, and dipropylene glycol monobutyl ether.

In a preferred embodiment, the second alcoholic solvent comprises, by weight of said solvent: from 70 to 100 wt. % of one or more $C_1$ to $C_4$ alkanols; from 0 to 30 wt. % organic co-solvent; and, from 0 to 20 wt. % water. The $C_1$ to $C_4$ alkanols are thus selected from methanol, ethanol, n-propanol, 2-propanol and 2-butanol, n-butanol, isobutanol, and tert-butanol, and combinations thereof.

The co-solvents which may be used in addition to the alcohols include: ether solvents such as diethylene glycol di-($C_1$-$C_4$)alkyl ether, dipropylene glycol di-($C_1$-$C_4$)alkyl ether, diethyl ether, dipropyl ether, methyl cyclopropyl ether, tetrahydrofuran, dioxane, and anisole; ketone solvents such as methyl ethyl ketone, diethyl ketone, isobutyl methyl ketone, cyclohexanone, isophorone, and acetophenones; ester solvents such as methyl acetate, ethyl acetate, butyl acetate, propyl acetate, methyl butyrate, ethyl butyrate, 2-methoxyethyl acetate, propylene glycol monomethyl ether acetate, dipropylene glycol butyl ether acetate, diethylene glycol monobutyl ether acetate, caprolactone, dioctyl phthalate, methyl lactate, and ethyl lactate; halogenated solvents such as chloroform and dichloroethane; diglyme and triglyme; amide solvents such as dimethylformamide, dimethylacetamide, pyrrolidone, N-methylpyrrolidone, and caprolactam; dimethyl sulfoxide; sulfolane; tetramethylurea; ethylene carbonate; propylene carbonate; dimethyl carbonate; ethyl carbonate; nitromethane; acetonitrile; and, nitrobenzene.

The combined amounts of the zwitterionic monomer and the non-zwitterionic co-monomer, together with any amount of the second (alcoholic) solvent are each controlled to achieve the desired solids content (monomer concentration) in the polymerization mixture. A solids content of from 5 to 80 wt. % is usual, with from 20 to 60 wt % being preferred. If the solids content is lower than 5 wt. %, the monomer concentration is often so low that the polymerization may not be brought to completion. Conversely, at a solids content above 80 wt. %, the polymerization mixture can have unduly high viscosity, rendering stirring more difficult and consequently reducing the degree of polymerization.

In an embodiment of step b), the molar amount of zwitterionic monomer which is combined and is therefore to be polymerized is in the range from 2 to 80 mol. %, preferably from 5 to 60 mol. % and more preferably from 10 to 50 mol. % based on the total number of moles of zwitterionic monomer and said at least one co-monomer.

Step c)

This step of the process—which may be performed sequentially to or concurrently with step b) of the present invention—involves co-polymerizing the zwitterionic monomer and the at least one co-monomer, thereby forming a dissolved or dispersed co-polymer; following the preferred methodology of the present invention the co-polymerization step will yield a co-polymer which is dissolved or dispersed within the solvent mixture formed by combining the first and second solvents.

The copolymers of the present invention can be synthesized by free radical polymerization, thermal polymerization, cationic polymerization, anionic polymerization, and combinations thereof. Preferably, the copolymers are synthesized using free radical polymerization.

As is known in the art, free radical polymerization requires the use of a source of free radicals (i.e. an initiator) to initiate the polymerization. Such a source of initiating radicals can be provided by any suitable means, such as the thermally induced homolytic scission of suitable compound(s), redox initiating systems, photochemical initiating systems or via high energy radiation such as electron beam, X- or gamma-radiation.

When employed, thermal initiators should generally be chosen to have an appropriate half-life at the temperature of polymerization. These initiators can include one or more of the following compounds: 2,2'-azobis(isobutyronitrile) (AIBN), 2,2'-azobis(2-cyanobutane), 2,2'-azobis(2-methylbutyronitrile) (AMBN), dimethyl-2,2'-azobis(isobutyrate), 4,4'-azobis(4-cyanovaleric acid), 1,1'-azobis(cyclohexanecarbonitrile), 2-(t-butylazo)-2-cyanopropane, 2,2'-azobis{2-methyl-N-[1,1-bis(hydroxymethyl)-2-hydroxyethyl]propionamide}, 2,2'-azobis[2-methyl-N-(2-hydroxyethyl)propionamide], 2,2'-azobis(N,N'-dimethyleneisobutyramidine) dihydrochloride, 2,2'-azobis(2-amidinopropane) dihydrochloride, 2,2'-azobis(N,N'-dimethyleneisobutyramidine), 2,2'-azobis{2-methyl-N-[I,I-bis(hydroxymethyl)-2-hydroxyethyl]propionamide}, 2,2'-azobis{2-methyl-N-[I,I-bis(hydroxymethyl)-2-ethyl]propionamide}, 2,2'-azobis[2-methyl-N-(2-hydroxyethyl)propionamide], 2,2'-azobis(isobutyramide) dihydrate, 2,2'-azobis(2,2,4-trimethylpentane), and, 2,2'-azobis(2-methylpropane). Alternatively or additionally, the thermal initiators may include: hydrogen peroxide; inorganic peroxides such as potassium, sodium or ammonium persulphate or percarbonates; organic peroxides, such as acyl peroxides and thereby including benzoyl peroxide; alkyl hydroperoxides such as t-butyl hydroperoxide; dialkyl peroxides such as di-t-butyl peroxide; and, peroxy esters such as t-butyl perbenzoate and the like. Exemplary thermal initiators may be found in http://www.sigmaaldrich.com/etc/medialib/docs/Aldrich/General_information/thermal_initiators.Par.0001.File.tmp/thermal_initiators.pdf, the disclosure of which is herein incorporated by reference.

Photochemical initiator systems are typically chosen to have an appropriate quantum yield for radical production under the conditions of the polymerization. Examples include benzoin derivatives, benzophenone, acyl phosphine oxides, and photo-redox systems.

Redox initiator systems are generally chosen to have an appropriate rate of radical production under the conditions of the polymerization. These initiating systems can include, but are not limited to, combinations of the oxidants potassium peroxydisulphate, hydrogen peroxide or t-butyl hydroperoxide with the reductants iron (II) thiosulphite, titanium (III) thiosulphite, sodium thiosulphite, potassium thiosulphite, sodium bisulphite or potassium bisulphite.

Moad and Solomon "The Chemistry of Free Radical Polymerisation", Pergamon, London, 1995, pp 53-95 might be mentioned as describing further suitable initiating systems. It is also envisaged that mixtures of free radical initiators may be used and, in particular, the combination of peroxy compounds with suitable redox systems, such as Fe.EDTA, Na or K pyrosulphite or bisulphite, and isoascorbic acid.

The amount of free radical initiator to be added to the monomer mixture will generally be in the range from 0.1 to 5.0 mol. %, and preferably from 0.2 to 2.5 mol. %, based on the total number of moles of monomer. Following a standard practice in the art, a supplementary amount of initiator may optionally be added at the end of the polymerization process to assist in the conversion of any residual monomers.

Whilst it is not preferred to do so, a chain transfer agent may be added to the monomer mixture to control the molecular weight of the copolymer formed. Suitable chain transfer agents include, but are not limited to: halogenated hydrocarbons such as carbon tetrabromide and bromotrichloromethane; mercaptans such as n-dodecylmercaptan, n-octylmercaptan, t-dodecylmercaptan; mercaptoethanol; iso-octyl thioglycolurate; and, $C_2$-$C_8$ mercaptocarboxylic acids and esters thereof, such as 3-mercaptopropionic acid and 2-mercaptopropionic acid.

The polymerization may be conducted at atmospheric pressure, elevated pressure or reduced pressure as is known in the art. Further, whilst the polymerization temperature is not particularly limited, and may be adjusted depending on the half-life of the polymerization initiator(s) used, it should preferably be from 0° C. or from 30° C. to 200° C., more preferably from 40° C. to 150° C. It is envisaged that the feed of the zwitterionic monomer and/or the feed of the co-monomer may be heated to a temperature up to the polymerization temperature before being introduced into the second alcoholic solvent. Independently, the second (alcoholic) solvent may itself be heated to a temperature up to the polymerization temperature prior to the introduction of the feeds into it, and then its temperature raised to and/or maintained at the polymerization temperature during the introduction.

Similarly, whilst the polymerization time is not particularly limited, it is preferred to continue the polymerization until a monomer conversion level of over 90 wt. %, preferably over 95 wt. % is reached. As such, the polymerization time will generally be from 0.5 hour to 48 hours, more usually from 1 hour to 24 hours and preferably from 3 hours to 6 hours.

Further, whilst the atmosphere is not particularly limited, the polymerization may be conducted in air or alternatively, may be conducted under an inert gas stream—such as a nitrogen stream—which eliminates oxygen.

The product of step c) of the present invention may optionally contain conventional additives, which additives may be introduced at any stage of the production process or may be added subsequently. It is envisaged, for instance, that additives may be introduced within the first and/or second alcoholic solvents. Such conventional additives include pigments, dyes, emulsifiers, surfactants, thickeners, heat stabilizers, levelling agents, anti-cratering agents, fillers, sedimentation inhibitors, UV absorbers, antioxidants, waxes, (anti-)slip agents, wetting agents, antifoaming and/or defoaming agents, fungicides, bactericides and other biocides, protective colloids and the like. And these additives may be introduced either individually or in one or more suitable premix.

The fouling resistant coating composition of the present invention may comprise at least one biocide. This biocide can be mixed with the copolymers using conventional paint-blending techniques. When the biocide is a pigment, it can be all or part of the pigment of the paint. The coating composition may have a pigment volume concentration of, for example, 30 to 60%.

The biocide can be one or more of an inorganic, organometallic, metal-organic or organic biocide for marine or freshwater organisms. Examples of inorganic biocides include copper metal and copper salts such as copper oxide, copper thiocyanate, copper bronze, copper carbonate, copper chloride, copper nickel alloys, and silver salts such as silver chloride or nitrate; organometallic and metal-organic biocides include zinc pyrithione (the zinc salt of 2-pyridinethiol-1-oxide), copper pyrithione, bis (N-cyclohexyldiazenium dioxy) copper, zinc ethylene-bis(dithiocarbamate) (i.e. zineb), zinc dimethyl dithiocarbamate (ziram), and manganese ethylene-bis(dithiocarbamate) complexed with zinc salt (i.e. mancozeb); and organic biocides include formaldehyde, dodecylguanidine monohydrochloride, thiabendazole, N-trihalomethyl thiophthalimides, trihalomethyl thiosulphamides, N-aryl maleimides such as N-(2,4,6-trichlorophenyl) maleimide, 3-(3,4-dichlorophenyl)-1,1-dimethylurea (diuron), 2,3,5,6-tetrachloro-4-(methylsulphonyl) pyridine, 2-methylthio-4-butylamino-6-cyclopopylamino-s-triazine, 3-benzo[b]thien-yl-5,6-dihydro-1,4,2-oxathiazine 4-oxide, 4,5-dichloro-2-(n-octyl)-3(2H)-isothiazolone, 2,4,5,6-tetrachloroisophthalonitrile, tolylfluanid, dichlofluanid, diiodomethyl-p-tosylsulphone, capsciacin, N-cyclopropyl-N'-(1,1-dimethylethyl)-6-(methylthio)-1,3,5-triazine-2,4-diamine, 3-iodo-2-propynylbutyl carbamate, medetomidine, 1,4-dithiaanthraquinone-2,3-dicarbonitrile (dithianon), boranes such as pyridine triphenylborane, a 2-trihalogenomethyl-3-halogeno-4-cyano pyrrole derivative substituted in position 5 and optionally in position 1, such as 2-(p-chlorophenyl)-3-cyano-4-bromo-5-trifluoromethyl pyrrole (tralopyril), and a furanone, such as 3-butyl-5-(dibromomethylidene)-2(5H)-furanone, and mixtures thereof, macrocyclic lactones such as avermectins, for example avermectin B1, ivermectin, doramectin, abamectin, amamectin and selamectin, and quaternary ammonium salts such as didecyldimethylammonium chloride and an alkyldimethylbenzylammonium chloride.

An inorganic biocide is a biocide whose chemical structure comprises a metal atom and which is free of carbon atoms; an organometallic biocide is a biocide whose chemical structure comprises a metal atom, a carbon atom, and a metal-carbon bond; a metal-organic biocide is a biocide whose chemical structure comprises a metal atom, a carbon atom, and which is free of metal-carbon bonds; and an organic biocide is biocide whose chemical structure comprises a carbon atom and which is free of metal atoms.

Furthermore, the biocide may optionally be wholly or partially encapsulated, adsorbed or supported or bound. Certain biocides are difficult or hazardous to handle and are advantageously used in an encapsulated or absorbed or supported or bound form. Additionally, encapsulation, absorption or support or binding of the biocide can provide a secondary mechanism for controlling biocide leaching rate from the coating system in order to achieve an even more gradual release and long lasting effect.

The method of encapsulation, adsorption or support or binding of the biocide is not particularly limiting for the present invention. Examples of ways in which an encapsulated biocide may be prepared for use in the present invention include mono and dual walled amino-formaldehyde or hydrolysed polyvinyl acetate-phenolic resin capsules or microcapsules as described in EP1791424.

Examples of ways in which an absorbed or supported or bound biocide may be prepared include the use of host-guest complexes such as clathrates as described in EP0709358, phenolic resins as described in EP0880892, carbon-based adsorbents such as those described in EP1142477, or inorganic microporous carriers such as the amorphous silicas, amorphous aluminas, pseudoboehmites or zeolites described in EP1115282.

Whilst it is not usually necessary do so, surfactants may be utilized—in an amount of from 0 to 15 wt. %, preferably 0 to 8 wt. % and more preferably 0 to 5 wt. % based on the total weight of the co-polymer—to assist in the dispersion of the resultant copolymer in the alcoholic solvents, even if the co-polymer is self-dispersible. Suitable surfactants include conventional anionic, cationic and/or non-ionic surfactants and mixtures thereof. Preferred surfactants include: fatty alcohols, ethoxylated fatty acids, fatty amides and/or Na—, K— and $NH_4$— salts of: fatty acids. Other useful anionic surfactants include alkyl or (alk)aryl groups linked to sulphonic acid groups, sulphuric acid half ester groups (linked in turn to polyglycol ether groups), phosphonic acid groups, phosphoric acid analogues and phosphates or carboxylic acid groups. Useful cationic surfactants include alkyl or (alk)aryl groups linked to quaternary ammonium salt groups. Non-ionic surfactants include polyalkyleneglycol compounds and copolymers thereof and, preferably, polyethylene oxide compounds.

The presence of cross-linking in the copolymers is not precluded by the present invention. That said, in certain exemplary embodiments, the copolymers of the present invention can be manufactured substantially free of cross-linking as such copolymers are considered to have sufficient mechanical strength that cross-linking is not necessary for making a polymer coating suitable for use as, for instance, a fouling resistant coating. The absence of cross-linking may serve to give these copolymers improved elasticity, particularly when dry, which reduces the likelihood of cracking during assembly and use of a coating containing them.
Step d)

In this step of the defined process, the solvent or mixture of first and second solvents in which the co-polymer formed in the polymerization step is dissolved or dispersed, is replaced with a third solvent in which that co-polymer shows sufficient solubility to form a solution of the co-polymer in that third solvent.

The chemical composition of the further or third solvent is not particularly limited but it should be capable of dissolving the co-polymer formed in step c) of the defined method. In an embodiment of the invention where the first and second alcoholic solvents are removed from the dispersion of the co-polymer by distillation, optionally at a reduced pressure, the third solvent should also be characterized by a boiling point which is higher than the boiling points of each of the first and second alcoholic solvents.

Generally, a mixture of the first and second solvents will be at least partially replaced using a procedure mainly based on evaporation or distillation operations, optionally performed at reduced pressure, and without liquid-liquid extraction. Without intention to limit the replacement procedure employed, exemplary processes include: loading-evaporation; constant level evaporation; loading-distillation; and, constant level distillation. The most suitable of these procedures will depend upon the equipment which may be associated with the polymerization reactor—in particular the control loops and distillation columns—and upon the volatility characteristics of the solvents in question. It is envisaged that either batch-wise or constant rate loading of the third solvent may be used.

The solvent replacement is performed at least until a solution of the co-polymer is formed. More usually the replacement will continue well beyond this point to account for the enhanced solubility of the co-polymer in the third solvent at the replacement temperature. As is known in the art, both the addition of the third solvent and the removal of the first solvent and any second solvent can be monitored volumetrically or by weight.

This process step of the invention has been performed effectively with a third solvent comprising benzene and/or one or more liquid alkyl benzenes. Particularly suitable, inert liquid alkyl benzene solvents are those having from 1 to 4 alkyl substituents on the benzene ring and in which the or each alkyl moiety contains from 1 to 12 carbon atoms, for instance from 1 to 6 or from 1 to 4 carbon atoms. Either straight chain, branched chain or cyclic alkyl substituents may be employed in this regard and representative examples of such inert liquid alkyl benzenes include: methylbenzene (toluene); dimethylbenzene; trimethylbenzene; ethylbenzene; diethylbenzene; isopropyl benzene; n-butyl benzene; tert-butyl benzene; 1,2,3,4-tetrahydronaphthalene (tetraline); n-hexyl benzene; cyclohexyl benzene; and, dodecyl benzene.

In an important embodiment, the third solvent comprises:
a) from 70 to 100 wt. % of benzene and/or one or more liquid alkyl benzenes in which the or each alkyl substituent on the benzene ring contains from 1 to 12, preferably 1 to 4 carbon atoms; and, b) from 0 to 30 wt. % organic co-solvent.

Further examples of suitable third solvents for the performance of step d) include: esters such as butyl acetate or isoamyl acetate; etheresters such as ethoxyethyl acetate or methoxypropyl acetate; ketones such as methyl isobutyl ketone or methyl isoamyl ketone; aliphatic hydrocarbons such as white spirit; and, mixtures of two or more of these solvents. It is also considered that the third solvent may comprise alcohols having a higher boiling point than the solvents, or mixtures of solvents, employed in the preceding steps. 1-butanol, ether alcohols such as butoxyethanol or methoxypropanol and glycol ethers such as diethylene glycol monomethyl ether might be specifically mentioned in this regard.

Exemplary Embodiment of the Invention

A particularly preferred embodiment of the present method for preparing a zwitterionic co-polymer, comprises the steps of:

a) i) providing zwitterionic monomer as defined in Formula Ia;

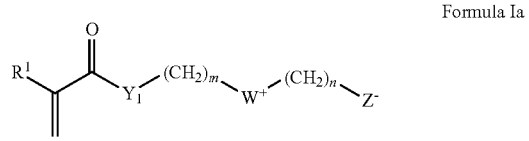

Formula Ia wherein:
$R_1$ is hydrogen or methyl;
Y is O;
W is $-N^+R^8R^9-$ in which $R^8$ and $R^9$ are independently selected from hydrogen and $C_1$-$C_4$ alkyl;
m=2 or 3;
n=1 to 5; and
Z is $SO_3^-$;

a) ii) dissolving said zwitterionic monomer in a first alcoholic solvent at a temperature in the range of from 30° C. to 120° C.;

b) maintaining said solution of zwitterionic monomer at a temperature in the range of from 30° C. to 120° C. and feeding said solution into a second alcoholic solvent, into which solvent is separately fed at least one co-monomer, said at least one co-monomer being selected from non-ionic ethylenically unsaturated monomers;

c) providing a free radical addition polymerization initiator and polymerizing the zwitterionic monomer and said at least one co-monomer to form a dispersion of co-polymer in said first and second alcoholic solvents; and, d) distilling said first and second alcoholic solvents from the co-polymer dispersion and replacing said first and second alcoholic solvents with a third solvent in which said co-polymer is soluble, thereby forming a solution of said co-polymer, said method being further characterized in that
said first alcoholic solvent is the same or different from said second alcoholic solvent, each of said first and second alcoholic comprising, by weight of said solvent from 70 to 100 wt. % of one or more $C_1$ to $C_4$ alkanols, from 0 to 30 wt. % of organic co-solvent and, from 0 to 20 wt. % water; and, said third solvent has a boiling point which is higher than the boiling points of each of the first and second alcoholic solvents.

Steps b) and c) may be performed sequentially or concurrently. The free radical addition polymerization initiator may be provided within the zwitterionic monomer solution, the second alcoholic solvent and/or the co-monomer feed. At least a portion of the initiator may also be independently and directly provided to the monomer mixture to be polymerized.

The present invention further contemplates preparations, formulations, coatings, films, and composite materials that contain the zwitterionic co-polymer. Whilst such materials may be useful in varied industrial and medical applications, a preferred industrial use of the co-polymer is in marine applications and, in particular, in fouling-release coatings for structures which are intended to be partially or wholly submerged in marine or fresh water environments. In this regard, the hulls and other surfaces of ships and boats, offshore marine structures such as oil rigs, sea water conduit systems, buoys, heat exchangers, cooling towers, desalination equipment, filtration membranes and docks might be mentioned as suitable substrates for the fouling release coatings.

It will be recognized that fouling release coatings comprising the zwitterionic copolymer will generally be applied to a substrate as the topcoat or a tie-coat. Preliminary anticorrosive layer(s), intermediate adhesion promoting layer(s) and topcoats where required, together with the fouling-release coating layer can be applied by methods well known in the art, including but not limited to brushing, spraying, dipping and rolling.

The zwitterionic copolymer either per se or as solution will be included in such coating compositions together with adjunct ingredients such as non-reactive (non-curable) silicone, polyolefin or biological oils, fillers, pigments, (co-) solvents, waxes, dyes, dispersants, wetting agents, surfactants, water scavengers and thickeners. It is preferred if the fouling release coating prepared from the copolymer is free of marine biocides, such as cuprous oxide.

EXAMPLES

The present invention is further defined in the following examples. These examples, while indicating preferred embodiments of the invention, are presented by way of illustration only.

Example 1: Zwitterionic Co-Polymer Based on Sulfobetaine Methacrylate (SBMA, Ralumer SPE) and n-Butyl Methacrylate in the Molar Ratio 9:91

(i) Polymerisation

Methylated spirits (45.0 g) was added to a 1000 ml reaction vessel (the 'pot vessel'). This vessel was assembled with a stirrer, flange lid, condenser, two liquid feed lines (1.6 mm peristaltic tubing) and a temperature controller and then heated to 75° C. under stirring.

Ralumer SPE (SBMA) (47.6 g) and Methylated spirits (240.0 g) were weighed into a 500 ml round bottomed flask (Feed Flask 1) which was heated under magnetic stirring to 70° C. The flask and contents were weighed at the start of the feed operation and removed from the heat source to be weighed approximately every 20 mins in order to monitor feed rate. The feed line was warmed with a heat gun as necessary to counter crystallization in the feed line.

n-BMA (241.1 g) was added to a separate 500 ml flask (Feed Flask 2) and the first quantity of AMBN initiator (9.06 g) added thereto and mixed under shaking.

The contents of the two feed flasks were charged concurrently to the pot vessel using peristaltic pumps (Model 101U/R, available from Watson Marlow Pumps Ltd.; initial settings 45 and 30 respectively) over a period of 4 hours whilst maintaining the vessel at 75° C. with stirring. Any exotherm was monitored and cooling was applied as necessary. At the end of feed, stirring was continued under heating for a further 1 hour.

In a 60 ml vial, the boost quantity of AMBN initiator (2.17 g) was dissolved in Methylated spirits (15.0 g) and the resultant solution charged to the reactor. Stirring was continued and the reaction held at 75° C. for a further 60 minutes before being allowed to cool.

(ii) Post Processing

A distillation head, condenser, receiver and peristaltic feed line (1.6 mm tubing) were fitted to the pot vessel. The receiver was placed on a balance in order to monitor distilled mass. The pot vessel was heated under stirring to an initial temperature of 80° C. to distil off the methylated spirits whilst slowly adding trimethylbenzenes (Mesitylene mixture) (262.0 g) using a peristaltic pump (setting 60). The distillation and replacement of the methylated spirits were continued until 200 g of distillate was removed. The resultant, copolymer solution product was a slightly translucent, colorless liquid.

The resultant copolymer was characterized by a number average molecular weight (Mn) of 13,000 and a polydispersity index (PDI) of 4.5 as measured by Gel Permeation Chromatography (GPC). The copolymer also had a glass transition temperature (Tg) of 23° C. as measured by Differential Scanning calorimetry.

Example 2: Zwitterionic Co-Polymer Based on Sulfopropylvinylpyridinium Betaine (Ralumer SPV) and n-Butyl Methacrylate in the Molar Ratio 9:91

The procedure of Example 1 was followed except that Ralumer SPE (SBMA) was replaced by Ralumer SPV (39.3 g). All other component quantities were identical except n-butyl methacrylate (249.2 g) and AMBN (9.26 g & 2.22 g respectively). The resultant copolymer solution was a beige, opaque liquid. The resultant copolymer was characterized by a number average molecular weight (Mn) of 12,000 and a polydispersity index (PDI) of 2.6. The glass transition temperature (Tg) of the copolymer was 34° C.

Example 3: Zwitterionic Co-Polymer Based on Sulfobetaine Methacrylate (SBMA, Ralumer SPE) and n-Butyl Methacrylate in the Molar Ratio 14:86

The procedure of Example 1 was followed except that 69.1 g of Ralumer SPE (SBMA) was used. All other component quantities were identical except n-butyl methacrylate (220.1 g) and AMBN (8.8 g & 2.10 g respectively). The resultant copolymer solution was an opaque white liquid. The resultant copolymer was characterized by a number average molecular weight (Mn) of 16,000 and a polydispersity index (PDI) of 6.2. The glass transition temperature (Tg) of the copolymer was 39° C.

Example 4: Zwitterionic Co-Polymer Based on Sulfobetaine Methacrylate (SBMA, Ralumer SPE) and n-Butyl Methacrylate in the Molar Ratio 18.5:81.5

The procedure of Example 1 was followed except that 89.1 g of Ralumer SPE (SBMA) was used. All other component quantities were identical except n-butyl methacrylate (200.4 g) and AMBN (8.5 g & 2.03 g respectively). The resultant copolymer solution was an opaque white liquid. The resultant copolymer was characterized by a number average molecular weight (Mn) of 11,000 and a polydispersity index (PDI) of 11.4. The glass transition temperature (Tg) of the copolymer was 48° C.

Example 5: Zwitterionic Co-Polymer Based on Sulfobetaine Methacrylate (SBMA, Ralumer SPE) and n-Butyl Methacrylate in the Molar Ratio 28:72

The procedure of Example 1 was followed except that AIBN initiator was used in place of AMBN. The component quantities were as follows: SBMA 63.8 g; BMA 83.7 g; AIBN 1.7 g and 0.8 g ($1^{st}$ and boost quantities respectively); methylated spirits 22.5 g in the pot, 120.0 g in feed 1; and, mesitylene 131.0 g. In the post-processing stage (ii), 100 g of distillate was removed. The resultant copolymer was characterized by a number average molecular weight (Mn) of 37,000 and a polydispersity index (PDI) of 9.5. The glass transition temperature of the copolymer was 34° C.

The above described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. A method for preparing a zwitterionic co-polymer comprising:
   a) providing a solution in a first alcoholic solvent of zwitterionic monomer as defined in formula I:

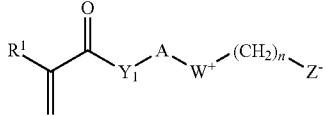

formula I wherein
   $R^1$ is hydrogen or methyl;
   $Y_1$ is selected from O and $NR^2$;
   A is a linear or branched alkyl group having from 1 to 16;
   $Z^-$ is $CO_2^-$, or $SO_3^-$ or

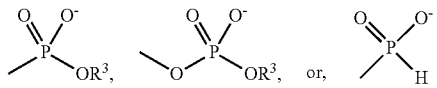

$W^+$ is $—S^+R^7—$, $—N^+R^8R^9—$, or $—P^+R^8R^9—$;
   n is an integer of from 1 to 5; and
   $R^2$, $R^3$, $R^7$, $R^8$, and $R^9$ are independently selected from hydrogen and $C_1$-$C_{20}$ alkyl, $C_6$-$C_{20}$ aryl and $C_7$-$C_{20}$ aralkyl;
   b) feeding said solution of zwitterionic monomer into a second alcoholic solvent into which solvent is separately fed at least one co-monomer, said at least one co-monomer being selected from cationic, anionic and non-ionic ethylenically unsaturated monomers;
   c) polymerizing the zwitterionic monomer and said at least one co-monomer to form a dispersion of co-polymer in said first and second alcoholic solvents; and,
   d) replacing at least a part of said first and second alcoholic solvents with a third solvent in which said co-polymer is soluble, thereby forming a solution of said co-polymer,
   wherein b) and c) may be performed sequentially or concurrently.

2. The method according to claim 1, wherein in formula I:
   $Y_1$ is O;
   $W^+$ is $—N^+R^8R^9—$; and,
   $Z^-$ is $SO_3^-$.

3. The method according to claim 1, wherein said ethylenically unsaturated co-monomer comprises at least 50 mol %, based on the total number of moles of co-monomer, of non-zwitterionic monomer selected from: (meth)acrylonitrile; alkyl (meth)acrylate esters; (meth)acrylic acids; vinyl esters; and, vinyl monomers.

4. The method of claim 3, wherein said ethylenically unsaturated co-monomer comprises at least 50 mol %, based on the total number of moles of co-monomer, of non-zwitterionic monomers selected from $C_1$ to $C_{14}$.

5. The method according to claim 1, wherein the molar amount of zwitterionic monomer to be polymerized is in the range from 2 to 80 mol. % based on the total number of moles of zwitterionic monomer and said at least one co-monomer.

6. The method of claim 5, wherein the molar amount of zwitterionic monomer to be polymerized is in the range from 10 to 50 mol. %, based on the total number of moles of zwitterionic monomer and said at least one co-monomer.

7. The method according to claim 1, wherein said polymerization c) is performed at a temperature of from 30° C. to 200° C. for a period of from 1 to 24 hours.

8. The method of claim 7, wherein said polymerization c) is performed at a temperature of from 40° C. to 150° C. for a period of from 3 to 6 hours.

9. The method of claim 1, wherein c) is a free radical addition polymerization initiated by free radical initiator, said free radical initiator being initially included in one or more of said solution of zwitterionic monomer, said second alcoholic solvent and said co-monomer feed.

10. The method according to claim 1, wherein said first alcoholic solvent and/or said second alcoholic solvent independently comprise, by weight of each said alcoholic solvent:
    from 70 to 100 wt. % of one or more $C_1$ to $C_4$ alkanols;
    from 0 to 30 wt. % organic co-solvent; and,
    from 0 to 20 wt. % water.

11. The method according to claim 1, wherein the third solvent has a boiling point which is higher than the boiling point of each of the first and second alcoholic solvents and wherein, in d), the first and second alcoholic solvents are removed by distillation from the co-polymer dispersion.

12. The method according to claim 1, wherein said third solvent comprises, by weight of said third solvent:
    from 70 to 100 wt. % of benzene and/or one or more liquid alkyl benzenes in which the or each alkyl substituent on the benzene ring contains from 1 to 12; and,
    from 0 to 30 wt. % organic co-solvent.

13. The method of claim 12, wherein the or each alkyl substituent on the benzene ring contains from 1 to 4 carbon atoms.

14. The method according to claim 1 for preparing a zwitterionic co-polymer, said method comprising:
a) i) providing zwitterionic monomer as defined in formula Ia;

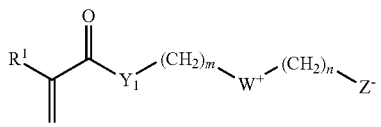

formula Ia wherein:
$R_1$ is hydrogen or methyl;
$Y_1$ is O;
$W^+$ is —$N^+R^8R^9$— in which $R^8$ and $R^9$ are independently selected from hydrogen and $C_1$-$C_4$ alkyl;
m is 2 or 3;
n is an integer of from 1 to 5; and
$Z^-$ is $SO_3^-$;
a) ii) dissolving said zwitterionic monomer in a first alcoholic solvent at a temperature in the range of from 30° C. to 120° C.;
b) maintaining said solution of zwitterionic monomer at a temperature in the range of from 30° C. to 120° C. and feeding said solution into a second alcoholic solvent, into which solvent is separately fed at least one co-monomer, said at least one co-monomer being selected from non-ionic ethylenically unsaturated monomers;
c) polymerizing the zwitterionic monomer and said at least one co-monomer to form a dispersion of co-polymer in said first and second alcoholic solvents; and,
d) distilling said first and second alcoholic solvents from the co-polymer dispersion and replacing said first and second alcoholic solvents with a third solvent in which said co-polymer is soluble, thereby forming a solution of said co-polymer,
and wherein
said first alcoholic solvent is the same or different from said second alcoholic solvent, and said first and second alcoholic solvents comprise, by weight of each said solvent, from 70 to 100 wt. % of one or more $C_1$ to $C_4$ alkanols, from 0 to 30 wt. % of organic co-solvent and from 0 to 20 wt. % water; and,
said third solvent has a boiling point which is higher than the boiling point of each of the first and second alcoholic solvents.

15. The method of claim 1, wherein $R^2$, $R^3$, $R^7$, $R^8$, and $R^9$ are independently selected from hydrogen and $C_1$-$C_6$ alkyl.

* * * * *